United States Patent
Asokan et al.

(10) Patent No.: US 8,059,818 B2
(45) Date of Patent: Nov. 15, 2011

(54) ACCESSING PROTECTED DATA ON NETWORK STORAGE FROM MULTIPLE DEVICES

(75) Inventors: Nadarajah Asokan, Espoo (FI); Philip Ginsboorg, Espoo (FI); Seamus Moloney, Rihimäki (FI); Tapio Suihko, Espoo (FI)

(73) Assignee: Nokia Corporation, Espoo (FI)

( * ) Notice: Subject to any disclaimer, the term of this patent is extended or adjusted under 35 U.S.C. 154(b) by 1216 days.

(21) Appl. No.: 11/057,107

(22) Filed: Feb. 11, 2005

(65) Prior Publication Data
US 2005/0193199 A1 Sep. 1, 2005

(30) Foreign Application Priority Data
Feb. 13, 2004 (WO) .................. PCT/IB2004/000377

(51) Int. Cl.
*H04L 9/00* (2006.01)
(52) U.S. Cl. ............... 380/277; 726/1; 726/2; 726/3; 726/4; 726/6; 726/10; 726/26; 726/27; 726/28; 726/29; 726/30; 713/168; 713/169; 713/170; 713/173; 713/174; 713/176; 713/155; 713/158; 709/205; 709/229; 709/228; 380/278; 380/279; 380/30; 380/282; 380/284; 705/51; 705/55; 705/59
(58) Field of Classification Search ............... 726/4
See application file for complete search history.

(56) References Cited

U.S. PATENT DOCUMENTS

| | | | |
|---|---|---|---|
| 5,684,950 A | 11/1997 | Dare et al. | |
| 6,539,092 B1 * | 3/2003 | Kocher | 380/252 |
| 7,068,789 B2 * | 6/2006 | Huitema et al. | 380/277 |
| 7,178,021 B1 * | 2/2007 | Hanna et al. | 713/155 |
| 7,185,362 B2 * | 2/2007 | Hawkes et al. | 726/4 |
| 2001/0012362 A1 * | 8/2001 | Marzahn | 380/42 |
| 2002/0157002 A1 * | 10/2002 | Messerges et al. | 713/155 |
| 2003/0112977 A1 | 6/2003 | Ray et al. | 380/270 |
| 2003/0126464 A1 * | 7/2003 | McDaniel et al. | 713/201 |
| 2003/0149854 A1 * | 8/2003 | Yoshino et al. | 711/173 |
| 2003/0149874 A1 * | 8/2003 | Balfanz et al. | 713/168 |
| 2005/0086532 A1 * | 4/2005 | Lotspiech et al. | 713/201 |
| 2005/0102513 A1 * | 5/2005 | Alve | 713/168 |

FOREIGN PATENT DOCUMENTS

| | | |
|---|---|---|
| EP | 0756397 A2 | 1/1997 |
| EP | 0952718 A2 | 10/1999 |
| EP | 1083699 A1 * | 3/2001 |
| EP | 1229442 A2 | 8/2002 |

(Continued)

OTHER PUBLICATIONS

Korean Office Action issued May 6, 2009 in corresponding Korean Patent Application No. 10-2007-7027545 (3 pages).

(Continued)

*Primary Examiner* — Nathan Flynn
*Assistant Examiner* — Bryan Wright

(57) ABSTRACT

The present invention relates to a method and a system of securely storing data on a network (100) for access by an authorized domain (101, 102, 103), which authorized domain includes at least two devices that share a confidential domain key (K), and an authorized domain management system for securely storing data on a network for access by an authorized domain. The present invention enables any member device to store protected data on the network such that any other member device can access the data in plaintext without having to communicate with the device that actually stored the data.

44 Claims, 4 Drawing Sheets

FOREIGN PATENT DOCUMENTS

| | | |
|---|---|---|
| EP | 1335563 A2 | 8/2003 |
| WO | WO 02/084460 | 10/2002 |

OTHER PUBLICATIONS

English Translation of Korean Office Action issued May 6, 2009 in corresponding Korean Patent Application No. 10-2007-7027545 (2 pages).

Chinese Office Action mailed Apr. 8, 2011 in parallel Chinese Patent Application No. 200480042709.2 (5 pages) together with English Translation thereof (7 pages).

Korean Office Action dated Oct. 23, 2007, 2 pages English translation and 2 pages Korean original—4 pages total.

* cited by examiner

ACCESSING PROTECTED DATA ON NETWORK STORAGE FROM MULTIPLE DEVICES

TECHNICAL FIELD OF THE INVENTION

The present invention relates to a method of securely storing data on a network for access by devices that belong to an authorized domain, an authorized domain management system for securely storing data on a network for access by devices that belong to an authorized domain, a master device to be included in an authorized domain management system for securely storing data on a network, a candidate device to be included in an authorized domain management system for securely storing data on a network, a method of removing devices that belong to an authorized domain from the authorized domain, a system for removing devices that belong to an authorized domain from the authorized domain, a computer program comprising computer-executable components for causing a device to perform a method of the present invention, a method of controlling access to data stored on a network and a system for controlling access to data stored on a network.

BACKGROUND ART

Storage of data on networks is one way to enable multiple devices access to the same data as well as providing back-up storage of the data. This is a common way for companies and enterprises to store their data on e.g. servers. This way of storing data does not result in any substantial security problems for the companies, as only company employees and thus no external users are allowed access to the data.

However, when users want to store data on a network to which other users that are not necessarily trusted have access, the users may be hesitant to put sensitive data such as personal information on the network storage server, because they are afraid that someone who has access to the storage server (an administrator, a hacker who breaks into the storage server etc.) will be able to access their sensitive data. A common and simple technique to provide a measure of security to the data is to encrypt the data using a password. However, passwords typically require manual entry by the user. In practice, this limits the length of a usable password and the number of possible passwords, which makes password based security system vulnerable to attacks. To mitigate the user's doubts regarding network storage, it is desirable to give the user the possibility to grant only a set of devices, which are selected by the user, access to the data. The devices included in the set are referred to as "authorized devices". An authorized domain is typically defined as a group of trusted devices—domain member devices—that are permitted to access a set of resources or services. In this authorized domain, the level of security should be rather high, which is normally not the case where passwords are employed. It should also be possible for domain members to access the same data simultaneously, and this should typically not require the concerned devices to communicate directly with each other. For this reason, employing solutions based on a single, access-enabling smartcard instead of passwords is not adequate.

One of the major problems associated with authorized domains is the distribution and management of encryption/decryption keys to domain members/devices. Another major problem that will be encountered when designing authorized domains is the resulting tradeoff that has to be made between a high level of security on the one hand and the desire to inhibit the complexity in the handling of the encryption/decryption keys on the other. Typically, a high level of security implies a complex and advanced key management operation.

SUMMARY OF THE INVENTION

An object of the present invention is to solve the above given problems and to provide a solution that facilitates management of cryptographic keys in an authorized domain.

Another object of the invention is to enable any domain member device to store protected data on the network such that any other domain member device can access the data in plaintext without having to communicate with the device that actually stored the data.

These objects are attained by a method, an authorized domain management system, a master device, a candidate device, a method, a system, a computer program comprising computer-executable components, a method of controlling access to data stored on a network and a system for controlling access to data stored on a network as described below.

According to a first aspect of the present invention, a method of securely storing data on a network for access by devices that belong to an authorized domain is provided, in which an authenticated channel is established between a domain member device and a candidate device that is to be included in the domain, over which channel authentication data of the candidate device is sent. The domain member device encrypts a confidential domain key with an encryption key of said candidate device and stores the encrypted domain key, thereby including the candidate device in the domain. Encrypted data is stored on the network, which data is encrypted at any storing domain member device by means of the domain key.

According to a second aspect of the present invention, an authorized domain management system for securely storing data on a network for access by devices that belong to an authorized domain is provided, which system comprises means for establishing an authenticated channel between a domain member device and a candidate device that is to be included in the domain, over which channel authentication data of the candidate device is sent. There are also provided means for encrypting, at the domain member device, a confidential domain key with an encryption key of said candidate device and storing the encrypted domain key, thereby including the candidate device in the domain. Further, the system comprises means for storing encrypted data on the network, which data is encrypted at any storing domain member device by means of the domain key.

According to a third aspect of the present invention, there is provided a master device to be included in an authorized domain management system for securely storing data on a network, which master device comprises means arranged to establish an authenticated channel with a candidate device that is to be included in the domain, over which channel authentication data of the candidate device is sent, Further the master device is arranged with means for encrypting a confidential domain key with an encryption key of the candidate device and for encrypting data with the domain key. There are also means for outputting the encrypted domain key and the encrypted data and for accessing encrypted data stored on the network and decrypting said data by means of the domain key.

According to a fourth aspect of the present invention, there is provided a candidate device to be included in an authorized domain management system for securely storing data on a network, which candidate device comprises means for sending authentication data over an authenticated channel established with a master device that is included in the domain.

Moreover, the candidate device comprises means for encrypting a confidential domain key with an encryption key of the candidate device and for encrypting data with the domain key. Further, there are also provided means for outputting the encrypted domain key and the encrypted data, and means for accessing encrypted data stored on the network and decrypting said data by means of the domain key.

According to a fifth aspect of the present invention, a method of removing devices that belong to an authorized domain from the authorized domain is provided, in which method a domain master device deletes, when a domain member device is removed from the domain, the encryption key that corresponds to said domain member device from an existing domain list and creates a new confidential domain key. Further, the master device encrypts the new domain key with each remaining encryption key, said each remaining encryption key being associated with the respective domain member device, obtained from the existing domain list and produces a new message authentication code based on the new domain key and the remaining encryption keys. The master device also creates an updated copy of the domain list based on the new domain key and storing the updated domain list on a storage capacity to which the domain member devices have access.

According to a sixth aspect of the present invention, a system for removing devices that belong to an authorized domain from the authorized domain is provided, in which system a domain master device is arranged with means for deleting, when a domain member device is removed from the domain, the corresponding encryption key that corresponds to said member device from an existing domain list and for creating a new confidential domain key. Further, the master device is provided with means for encrypting the new domain key with each remaining encryption key, said each remaining encryption key being associated with the respective domain member device, obtained from the existing domain list and producing a new message authentication code (MAC) based on the new domain key and the remaining encryption keys. The master device is also provided with means for creating an updated copy of the domain list based on the new domain key and storing the updated domain list on a storage capacity.

According to a seventh aspect of the present invention, there is provided a computer readable medium having a program stored thereon comprising computer-executable components for causing a device to perform the steps recited in any one of the methods described below when the computer-executable components are run on a microprocessor included in the device.

According to an eighth aspect of the present invention, there is provided a method of controlling access to data stored on a network, in which method access authentication data is created that is known to a network server and to devices that are allowed to access the data stored on the network. Further, the network server checks whether a device is in possession of said access authentication data, and the network server thereafter controls access by the device to the data stored on the network.

According to a ninth aspect of the present invention, there is provided a system for controlling access to data stored on a network, in which system means are provided for creating access authentication data that is known to a network server and to devices that are allowed to access the data stored on the network. Further, means are arranged at the network server to check whether a device is in possession of said access authentication data, and the network server thereafter controls access by the device to the data stored on the network.

The idea of the invention is that first, when introducing a candidate device to the authorized domain, an authenticated channel must be established by a device that is already included in the domain—the domain member—and the device which is to be included in the domain—the candidate device. Use of this authenticated channel assures the receiver that the identity of the sender of the information is not false. Many known channel setups are suitable for this purpose. For example, the devices may exchange a limited amount of authentication information over a privileged side channel, a so-called location-limited channel, which will then allow them to authenticate each other. An example of a location-limited channel is an infrared (IR) or RFID connection. The physical closeness of the communicating devices required by the location-limited channel provides a measure of authenticity to the information exchanged over that channel. Use of this authenticated channel assures the user (i.e. the receiver of authentication information) that the identity of the sender of the information is not false.

Then, the candidate device transfers its encryption key to the domain member device. To include the candidate device in the domain, a confidential domain key is encrypted by means of an encryption key of the candidate device. This encryption is performed at the domain member device, which then stores the encrypted domain key in some appropriate location, for example on the network or locally at the device. The shared access to the domain key by the domain member devices is what actually ties the devices to the domain. Consequently, after a copy of the domain key encrypted with the encryption key of the candidate device has been stored on the network, the candidate device is included in the authorized domain, i.e. the candidate device has become a domain member. This is a procedure that has to be performed for every new device to be included in the domain. Hence, for every device included in the domain, there will exist a corresponding encrypted copy of the domain key, i.e. the corresponding encrypted copy of the domain key comprises the domain key encrypted by the encryption key of the concerned device.

When a domain member device wants to store data in a storage unit, e.g. a server, on the network, it encrypts the data by using the domain key.

The present invention is advantageous, as a number of security requirements are complied with: only a set of devices that have been included in the domain, and thus have been elected by the domain administrator, is given access to data stored on the network; the administrator can rather easily manage the set of domain member devices; keys need not be entered manually, which enables a higher level of protection by cryptographic mechanisms; it is possible to access the same data simultaneously from multiple devices; finally, the accessing of data by domain member devices does not require the devices to contact each other.

According to an embodiment of the invention, the encrypted domain key is fetched from a network storage (or possibly from a local storage). The domain key has been encrypted by the encryption key of the domain member device and is decrypted by using the decryption key of the device. After decryption, the domain key is in the clear and can thus be utilized by a member device to encrypt the data to be stored on the server.

According to another embodiment of the present invention, when a domain member device wants to access encrypted data stored on the server, it decrypts the data by using the domain key fetched from the location in which it is stored. The domain key has been encrypted by the encryption key of the accessing domain member device and is decrypted by using the decryption key of the device. After decryption, the domain key is in the clear and can thus be utilized to decrypt the data. If a device has the authority to alter the data it has fetched from the network, the new data must be encrypted before being stored on the network. The domain key is used to encrypt the data prior to storage.

These two embodiments are highly advantageous, as they enable any member device to access any data stored on the network in a rather non-complex and seamless manner. As the domain key is always stored on some storage capacity to which a domain member device has access, it is not necessary to employ a complicated key distribution system in the authorized domain, as is often the case in prior art systems.

According to other embodiments of the invention, the encryption key employed to encrypt the domain key is the public key of the candidate device (that subsequently becomes a domain member device) and the decryption key used to decrypt the encrypted domain key is the private key of the candidate device, which private key corresponds to said public key. This is the preferred embodiment regarding the choice of cryptographic keys, as the public keys need not be confidential. This greatly simplifies the management of these keys. For the same reason, it is also possible to transfer plain text copies of the public keys across the location-limited channel. Another advantage in using asymmetric key pairs is that digital signatures can be provided, if desired.

It also possible to establish a confidential communication channel between the domain member device and the candidate device that is to be included in the domain, over which the encryption key of the candidate device is transferred. This is required if the encryption key is a confidential symmetric key of the candidate device (that subsequently becomes a domain member device). In the case of a symmetric encryption key, the same key is used for encryption and decryption. Symmetric encryption of data is not as computationally demanding as asymmetric encryption. However, the key management requirements will be harsher.

Note that, in case the encryption key is a public key, it is possible to set-up a confidential channel and transfer the key over said confidential channel, even though it is not required.

According to yet another embodiment of the invention, the encryption of data before storing the encrypted data on the network and the decryption of said encrypted data is performed by a file encryption key, which is different from the domain key. This key is generated by a pseudo random function processing the domain key and the domain identifier. For example, the domain key is concatenated to the domain identifier and the resulting concatenated data is input to a pseudo random function. This function can be implemented in software using a computer algorithm or in hardware using a linear feedback shift register. The actual functions are well known in the prior art and do not lie within the scope of the present invention. This has the advantage that a great measure of key independence is attained: even if a third party manages to break the file encryption key, the third party cannot recover the domain key. Thus, legitimate domain members can create new file encryption keys and encrypt new data files with those keys, such that the attacker cannot read those data files.

According to another embodiment of the invention, the action of including a device in the domain can only be performed by a master device included in the domain. The master device thus becomes the owner and administrator of the authorized domain. This is preferred, as it greatly will facilitate the management of the domain.

According to a further embodiment of the present invention, a domain list is stored on the network. The list comprises a domain identifier, the public key of each domain member device, a message authentication code including the public keys and a domain authentication key derived from the domain key, and the encrypted domain key that corresponds to each domain member device. This domain list defines the domain and is a structured way of storing domain information when performing revocation of devices from the network, as will be described. The domain authentication key can be produced in the same manner as the previously mentioned file encryption key, i.e. using a pseudo random function. A message authentication code is a mechanism for providing message authentication using cryptographic hash functions.

According to yet another embodiment of the invention, when a domain member device is to be removed from the domain, i.e. the domain member device is revoked, the master device deletes the corresponding public key from the domain list. Further, it creates a new confidential domain key. This new domain key is encrypted with each remaining public key obtained from the domain list and a new message authentication code is produced based on the new domain key and the remaining public keys. Moreover, an updated copy of the domain list based on the new domain key is created at the master device. This updated list is stored on the network, appended to the existing domain list. When creating an updated list and appending the new list to the existing list, the data that is stored on the network and encrypted by the previously used domain key will not be re-encrypted by the new domain key, as both lists are in existence. When the remaining devices access encrypted data stored on the network, they will re-encrypt it with the new domain key. When all the data has been re-encrypted with the new network key, the old network list is not needed any more. If a new device is included in the domain, the new device must also be included on old domain lists, since it needs to have access to the old domain keys to access data encrypted by the old keys.

According to still another embodiment of the present invention, instead of appending the updated domain list to the existing domain list, the existing domain list is replaced by the updated list. Further, the encrypted data stored on the network is decrypted at the master device by means of the old domain key and encrypted by means of the new domain key before being stored on the network. This embodiment has the advantage that old domain lists need not be maintained on the network, since all data is re-encrypted with the new domain key and, thus, the old domain key is no longer needed.

According to yet another embodiment of the present invention, each domain key has an associated usage counter that is also part of the domain list. The counter is initialized, typically to zero, when a new domain key is created. When a file is encrypted by means of the domain key, the counter is incremented. When a file is decrypted using the domain key, the counter is decremented. The old domain list can be deleted if its domain key is no longer used, i.e. if its usage counter is zero and if in addition there is another domain list appended to it. The advantage of this embodiment is that old domain lists can be deleted without the need to re-encrypt all the data files at the same time.

Further, there is provided in an aspect of the invention an access control function, which ensures that only members of a domain can modify (or possibly even read) files belonging to that domain. Preferably the access control management is based on the following principle: file protection by encryption and domain group membership are managed by the domain members themselves, while domain-specific access rights are managed by the network server. An advantage of separating domain management from the server is that existing access control methods may be used, and that the server is relieved from the complex task of managing domain membership.

Another advantage is that, if the server is not considered trusted, security is enhanced by separating the server from the domain management.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Preferred embodiments of the present invention will be described in detail with reference made to the accompanying drawings, in which.

DETAILED DESCRIPTION OF EMBODIMENTS OF THE INVENTION

Figure 1:
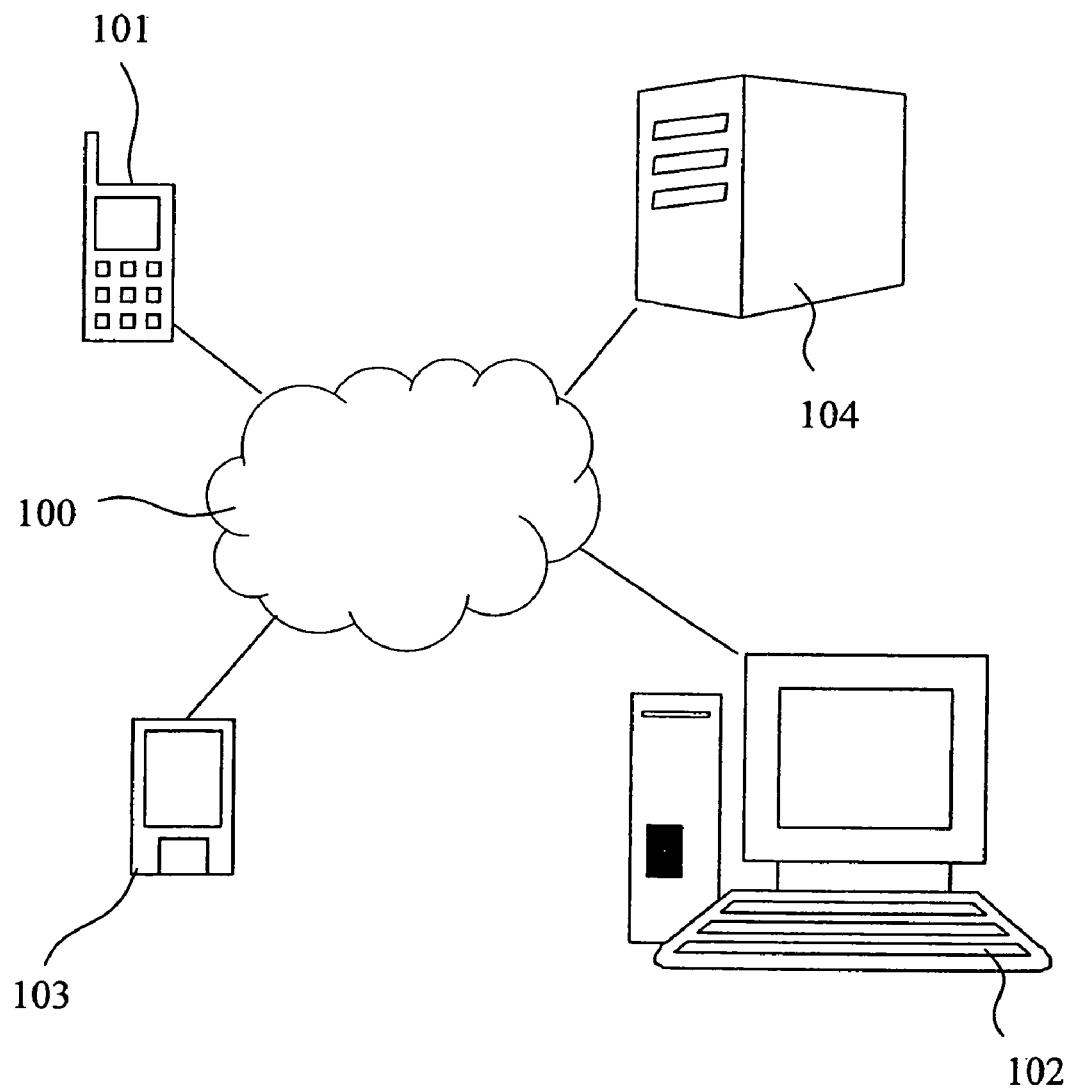
FIG. 1 shows a number of devices comprises in an authorized domain.

FIG. 1 shows a number devices, e.g. a mobile phone 101, a computer 102, a personal digital assistant (PDA) 103, a server 104 including a storage device having a selected storage capacity etc., interconnected via a network 100 such as the Internet, a wireless local area network (WLAN), a public switched telephone network (PSTN) etc. An authorized domain is typically defined as a group of interconnected trusted devices that are permitted to access a set of resources or services. The interconnection could be implemented via, for example, a radio interface, an infrared interface, a cable interface etc. In FIG. 1 the mobile phone 101, the computer 102 and the PDA 103 are domain member devices storing data on the network server 104.

One of the main advantages of the present invention is that the network server need not be comprised in the authorized domain. The server can be any (untrusted) storage provider.

In an authorized domain as shown in FIG. 1, a domain management application is envisaged, which allows a user to define authorized domain parameters and/or rules for access to network data and distribute encryption/decryption keys to domain members. The domain management application typically includes a file browser to be installed in the domain member devices that are included in the domain. This allows a user of a device to easily browse through data stored on the network.

Figure 2:
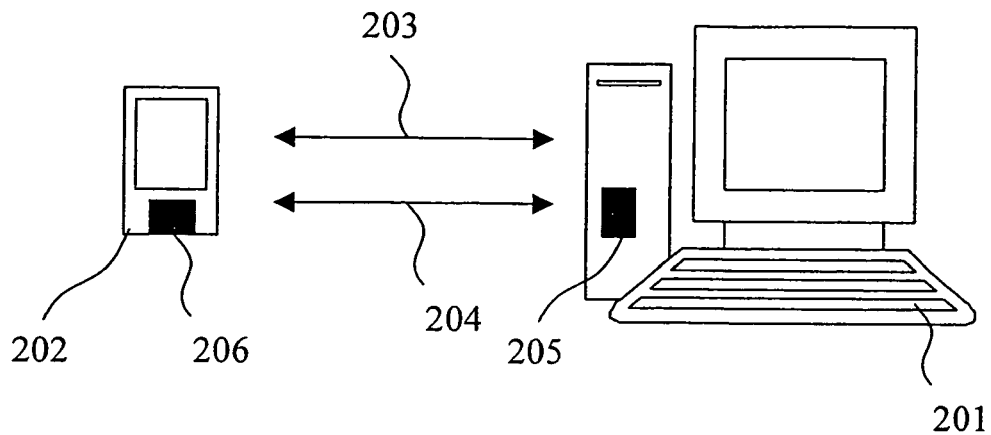
FIG. 2 illustrates the including of a candidate device in an authorized domain according to an embodiment of the present invention.

Turning to FIG. 2, when including a candidate device 202 in the domain, a master device 201 comprised in the domain will typically establish a connection 203 with the candidate device, i.e. the device to be included in the authorized domain. This establishment is typically effected by a microprocessor 205 in the master device, which microprocessor executes appropriate software provided by the domain management application. The microprocessor is the brain of each device and performs all computing/processing operations undertaken by the respective device. The candidate device is also equipped with a microprocessor 206 that executes domain management software.

A minimum requirement on the connection—or channel—203 to be established is that it can be considered authenticated, e.g. based on physical closeness between the communicating devices. It must be ensured that information exchanged over the channel allows the two devices 201, 202 to subsequently authenticate each other. For example, the devices may exchange a limited amount of authentication information over a privileged side channel, a so called location-limited channel 203, which will then allow them to complete an authenticated key exchange protocol over a wireless channel 204 and to secure the wireless channel 204 based on the exchanged keys.

On the master device 201, the user starts the domain management application and brings the master device 201 and the candidate device 202 physically close to each other (the location-limited channel may be established by means of IR or RFID technology). On the candidate device 202, the application automatically starts up and displays a prompt to the user. The prompt says "Accept introduction from master device"? Three options are available: "Accept", "Reject" and "Edit". The Edit button can be used to edit a number of parameters shown to the user. When the user clicks the "Accept" button the application completes execution silently. For the master device 201, the procedure is the same.

Figure 3:
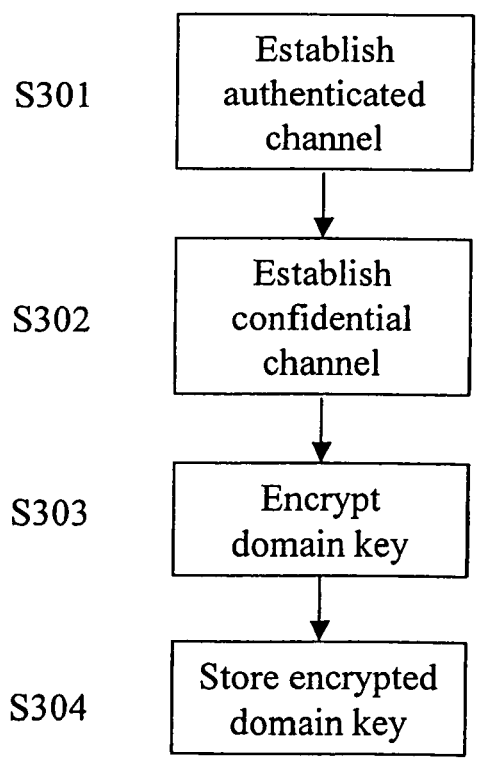
FIG. 3 shows a flowchart of encryption of a domain key in accordance with an embodiment of the invention.

With reference made to FIG. 3, in basic pre-authentication schemes, devices exchange authentication information relating to their public keys over a location-limited channel, as indicated at S301. The information that is actually exchanged can be the public keys themselves, their certificates, or simply secure "traces" of the keys using cryptographic hash functions such as SHA-1. The only requirement is that the information exchanged allows the receiver to verify the authenticity of the key that is used in the authentication protocol of the (non location-limited) wireless channel.

Devices may via any type of channel, e.g. a wireless channel such as IR, radio or audio or via a cable, exchange hash values, i.e. traces, of their respective public keys in the pre-authentication phase. For convenience, each device 201, 202 can also transmit its address in wireless space (e.g. an IP address and a port number, or a Bluetooth device address). Thus, the master device 201 sends its address and a hash value of its public key to the candidate device 202. Thereafter, the candidate device sends its address and a hash value of its public key to the master device. This pre-authentication data can be used by the devices to authenticate each other via the confidential channel 204.

Once the pre-authentication is completed, the devices proceed to establish a secure connection S302 between them over the wireless channel 204. To this end, they can use any established public-key-based key exchange protocol (e.g. SSL/TLS, SKEME, IKE etc.) that requires them to prove possession of a particular private key, which in this case will correspond to the public key authentication information of the pre-authentication step. The choice of key exchange protocol may influence the exact form of the pre-authentication data exchanged, and in particular whether parties exchange their complete public keys or merely traces of them. If the key exchange protocol used on the wireless link explicitly sends public keys or certificates, only traces of those public keys need to be exchanged in pre-authentication. It is then possible to limit the amount of pre-authentication data exchanged over the location-limited channel. If instead it expects parties to already have each other's public keys, then the keys themselves should be exchanged during pre-authentication. In this specific case, the devices exchange public keys over the confidential channel 204.

To include the candidate device 202 in the domain, a confidential domain key is encrypted S303 by means of the public encryption key of the candidate device. This is performed at the domain member device 201 which then stores S304 the encrypted domain key on the network 100. The candidate device is now a member of the authorized domain.

Figure 4:
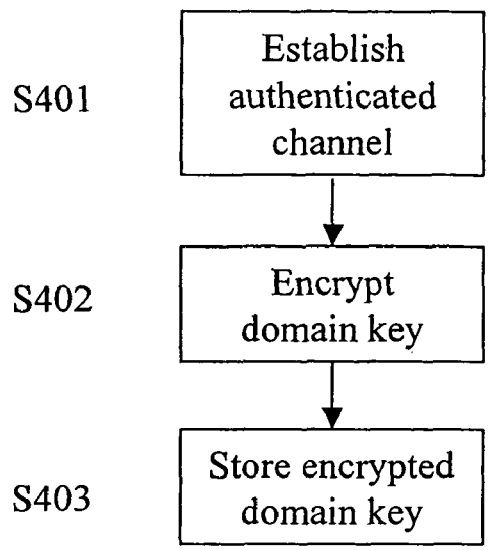
FIG. 4 shows a flowchart of encryption of a domain key in accordance with another embodiment of the invention.

In another embodiment of the present invention, when an asymmetric key pair is used, the public keys can be exchanged over the location-limited channel 203. Turning to FIG. 4, the devices 201, 202 exchange authentication information relating to their public keys, as well as their public keys, over the location-limited channel, as indicated at S401.

Thus, the master device 201 sends its address, its public key and a hash value of its public key to the candidate device 202. Thereafter, the device 202 sends its address, its public key and a hash value of its public key to the master device 201. This pre-authentication data can be used by the devices to authenticate each other. As the public keys need not be confidential, it is possible to transfer the public keys in plain text across the location-limited channel. Thereafter, in analogy with the procedure of FIG. 3, to include the candidate device 202 in the domain, a confidential domain key is encrypted, at S402, by means of the public key of the candidate at the master device 201, to which the public key previously has been transferred via the location-limited channel 203. The master device then stores S403 the encrypted domain key on the network, typically at a remote network storage device such as a server.

It is also possible that a confidential symmetric key of the candidate device 202 is used in the pre-authentication phase and for encryption/decryption of the domain key, once the candidate device has become a domain member device. In that case, hash values of the symmetric keys can be transferred across the location-limited channel 203 and the symmetric keys are encrypted before being transferred via the wireless channel 204.

When a device is included in the authorized domain, a domain list is stored on the network. The domain list may be stored on the same server 104 as the encrypted data files. In case multiple domain lists are stored on multiple network servers, the domain member devices knows which server is used for storage of each respective domain list. This can be implemented by sending a notification from the master device to the respective domain member device, which notification indicates which list is stored on which server.

The list comprises:
- a domain identifier,
- the public key (PK1, PK2, . . . ) of each domain member device,
- a message authentication code (MAC) including each public key and a domain authentication key (KA) derived from the domain key (K), and
- the encrypted domain key (EPK1 (K), EPK2 (K), . . . ) that corresponds to each domain member device.

The list is graphically illustrated below.

This domain list defines the domain and is a structured way of storing domain information when excluding devices from the domain, as will be described. The domain authentication key KA is generated by a pseudo random function based on the domain key K and the domain ID. In an exemplifying implementation, the domain key is concatenated to the domain identifier and the resulting concatenated data is input to the pseudo random function. This function can be implemented in software using a computer algorithm or in hardware using a linear feedback shift register. A message authentication code is a mechanism for providing message authentication using cryptographic hash functions. The domain list may also have a timestamp to facilitate management operation. The timestamp may be in the form of the last calendar time at which the domain list was modified, or it may be generated by a counter that is initialized to zero when a domain list is created and incremented each time the domain list is modified. The domain list must be accessible for all domain member devices, since each device fetches its encrypted domain key, i.e. its component, from the list.

Figure 5:
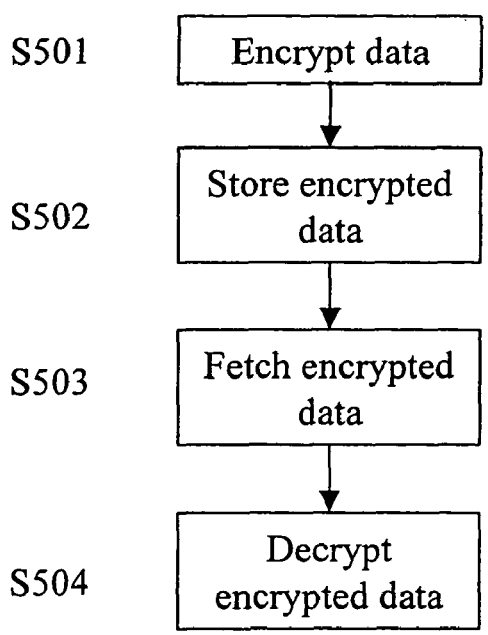
FIG. 5 shows a flowchart of the storing and the fetching of data on the network in accordance with an embodiment of the invention.

Turning to FIG. 5, when a domain member device, e.g. the PDA 101, wants to store data in a network storage unit, e.g. the server 104, on the network 100, it encrypts S501 the data by using a domain key K fetched from the server 104. This particular copy of the domain key has been encrypted by the public key of the PDA and stored in the domain list, and is decrypted by using the private key of the PDA. The domain key is utilized to encrypt the data to be stored on the server. The encrypted data is then stored S502 on the network.

When a domain member device, say the computer 102, wants to access encrypted data stored on the server 104, it fetches S503 the encrypted data from the network and decrypts the data by using a domain key K fetched from the server. The domain key has previously been encrypted by the public key of the computer and is decrypted by using the corresponding private key of the computer. After decryption, the domain key K can be employed to decrypt S504 the data. As a result, the data is in the clear.

If the computer is allowed to alter the data, the altered data must be re-encrypted by the computer before being stored on the network.

When data is encrypted and stored on the network, the encryption may be performed by means of a file encryption key KE. This key is generated in the same manner as the domain authentication key KA, using the domain key K as a seed.

Figure 6:
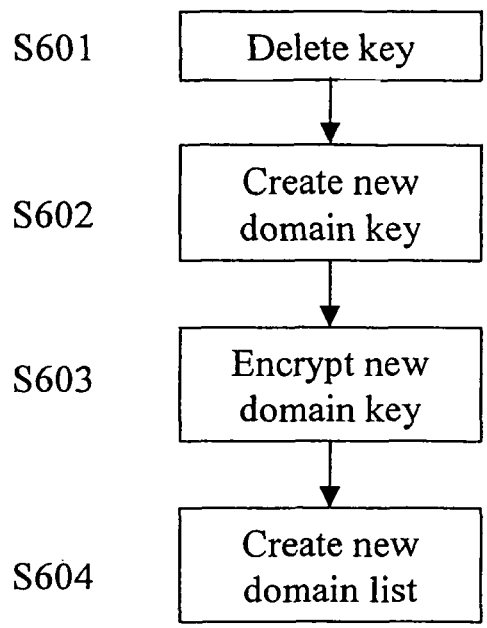
FIG. 6 shows a flowchart of the removing of a domain member device from the domain according to an embodiment of the invention.

With reference made to FIG. 6, when a domain member device is removed from the authorized domain, the domain master device deletes S601 the corresponding public key (or the symmetric key, in case symmetric encryption is employed) from the domain list. Further, it creates S602 a new confidential domain key K'. This new domain key is encrypted S603 with the public key of each remaining domain member device, which keys are obtained from the domain list, and a new message authentication code is produced based on the new domain key and the remaining domain public keys. After these modifications, an updated domain list is created S604 at the master device. This updated list is stored on the network, appended to the existing domain list.

The updated list is graphically illustrated below. Note that only the updated list is illustrated below. This updated list is appended to the existing list illustrated hereinabove.

| Domain ID | (PK1, PK2, ...) | | EPK1 (K) | EPK2 (K) | ...... |
|---|---|---|---|---|---|
| | MAC (KA, PK1|PK2|...) | | | | |

| Domain ID | (PK1, PK3, ...) | | EPK1 (K') | EPK3 (K') | ...... |
|---|---|---|---|---|---|
| | MAC (KA', PK1|PK3|...) | | | | |

This specific appearance of the updated domain list implies that the domain member device corresponding to PK2 has been removed form the domain.

When an updated list is created and appended to the existing list, the data that is stored on the network and encrypted by the old domain key K need not be re-encrypted by the new network key K', as both lists are still alive. When the remaining domain member devices access encrypted data stored on the network, they will re-encrypt it with the new network key. When all the data has been re-encrypted with the new network key, the old network list may be deleted.

Figure 7:
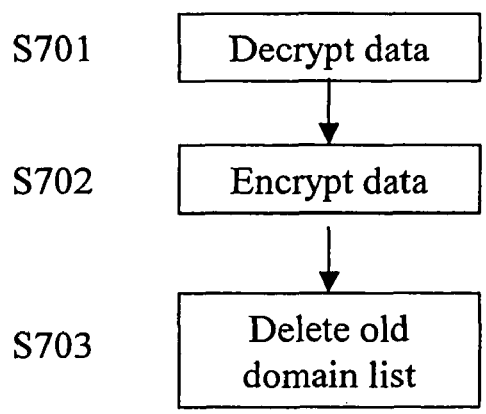
FIG. 7 shows a flowchart of the deletion of an old domain list when a domain member device is removed from the domain.

In FIG. 7, another approach which is employed when a domain member device is removed from the domain is to delete S703 the existing domain list. This has the consequence that the encrypted data stored on the network must be decrypted S701 at the master device by means of the old domain key K and encrypted S702 by means of the new domain key K' before being restored on the network.

In an embodiment of the present invention, each domain key has an associated usage counter that is part of the specific domain list to which the domain key belongs. The counter is initialized when a new domain key is created. The counter is further incremented when a data file is encrypted by means of the new domain key and decremented when a data file is decrypted by means of the new domain key. This has the effect that an existing domain list can be deleted if its domain key is no longer in use. A domain key is considered to be no longer in use when the usage counter reaches its initialization value, which is typically 0, and another domain list is appended to the domain list to be deleted. Consequently, old domain lists can be deleted without the need to re-encrypt all the data files at the same time.

As mentioned hereinabove, a domain master device administrates the domain. In theory, any domain member device could be used to include a candidate device in the domain. However, if any domain member device is allowed to perform administration of the domain, such as adding/deleting devices to/from the domain or changing the domain key, they need to verify the authenticity of the member list and use it to create the new domain list. This would require that the member list contains device IDs, so they can be displayed to the users of the other domain member devices.

According to another aspect of the present invention, an access control function is provided, which ensures that only members of a domain can modify (or possibly even read) files belonging to that domain. Preferably the access control management is based on the following principle: file protection by encryption and domain group membership are managed by the domain members themselves, while domain-specific access rights are managed by the network server. An advantage of separating domain management from the server is that existing access control methods may be used, and that the server is relieved from the complex task of managing domain membership. Another advantage is that, if the server is not considered trusted, security is enhanced by separating the server from the domain management.

In an implementation of the access control function, access control is based on usernames and passwords, as is commonly done in existing systems. For example, there is a specific access key A that is known both to the server 104 and to all member devices 101, 102, 103 of the domain. That access key A may be different for each domain. The network server allows a device to modify files that belong to a specific domain only if that device proves that it knows the access key A for said specific domain.

In this implementation, a device would authenticate itself to the network server with Username=Domain_ID and Password=f(A), where f( ) is a one-way hash function, e.g. of the type SHA-1. The device may alternatively authenticate itself to the network server by means of encrypting a message with the commonly shared access key, wherein the shared access key is used at the network server to ensure that the message was sent by a holder of the access key. To prevent replay attacks, the server may first send a random number C to the device and the password computation must include that random number, i.e. Password=f(A, C). The access key A may be stored in the domain list, e.g. it may be encrypted separately for each device using the public key of said each device, together with the domain key K: EPK1(K, A), EPK2(K, A), etc. Then, if a member is removed from the domain, the domain master device creates a new access key A' and communicates this new key to the server. The corresponding new domain list will contain the new access key A'. Rights to read the domain list can be granted to anyone. An advantage of the access control function is that the users of domain member devices need not be aware of password-controlled access.

Members and non-members alike may read the new domain list, but only legitimate members can extract the new access key A' from the new domain list and thus modify existing files or create new files. An additional advantage is that after a password is changed, the new password need not be immediately distributed to legitimate domain members.

Note that access authentication data can be associated to a group of devices in many different ways, it may for example be feasible to use (a) the same access authentication data for members of multiple domains or (b) different access authentication data for each member, regardless of the domains.

In a first embodiment of the access control function, the access authentication data is independent of the domain identification and the domain key K and is explicitly included, after having been encrypted by the public key of the respective domain member device, in the domain list. Hence, the server need not be informed of a change of the domain key, which may be a reasonable trade-off between security and ease of management. Although it is not strictly required, it is advisable that the access authentication data is changed when members are removed from the domain, if security is to be accentuated, as revoked members otherwise may effect denial-of-service attacks on the system. In a second embodiment, the access authentication data is deterministically derived from the domain ID and the domain key K, and therefore need not be explicitly included in the domain list. The access authentication data may be generated in a manner similar to the domain authentication key KA, which was previously described. This second embodiment requires the server to be informed each time the domain key is changed.

It should be clear that the term "access authentication data" has different meanings depending on the context in which the term appears; for example, when using the access key A to produce a password, both the password and the corresponding username is interpreted as "access authentication data", whereas in another context, the term "access authentication data" may embrace only the access key A. Many variants for generating access authentication data are feasible, and a man skilled in the art realizes that modifications may be done to the described embodiments to generate data for authentication of a device at the network server, without departing from the basic idea of using access authentication data described hereinabove.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method comprising:
securely storing data on a remote network for access by devices that belong to an authorized domain by:
a domain member device of said authorized domain establishing an authenticated channel between said domain member device and a candidate device that is to be included in the domain, over which channel authentication data of the candidate device is sent;
said domain member device receiving an encryption key from said candidate device;
said domain member device encrypting a confidential domain key with said encryption key of said candidate device and storing the encrypted confidential domain key,
thereby including said candidate device in the domain so that said candidate device included in said authorized domain is enabled to store encrypted data of a user of said candidate device on the remote network along with other encrypted data of other users encrypted at any storing domain member device and stored on the remote network and made accessible to said devices that belong to the authorized domain by means of the confidential domain key, wherein said including the candidate device in the domain is performed by a master device included in the domain,
said master device storing, on the remote network, a domain list comprising a domain identifier, a encryption key of each domain member device, a message authentication code including each encryption key and a domain authentication key derived from the confidential domain key, and encrypted encryption key that corresponds to each domain member device;
said master device deleting, when a domain member device is removed from the domain, the encryption key corresponding to said domain member from the existing domain list;
said master device creating a new confidential domain key;
said master device encrypting the new confidential domain key with each remaining encryption key obtained from the existing domain list and producing a new message authentication code based on the new confidential domain key and the remaining encryption keys; and
said master device creating an updated domain list based on the new confidential domain key and storing the updated domain list on the remote network.

2. The method according to claim 1, wherein storing the encrypted confidential domain key further comprises:
storing the encrypted confidential domain key locally at the domain member device or on the remote network.

3. A method comprising:
securely storing data on a network for access by devices that belong to an authorized domain by:
a candidate device exchanging authentication data over an authenticated channel established with a domain member device that is included in an authorized domain, wherein said authentication data includes an encryption key of the candidate device with which a confidential domain key is encrypted and provided to said candidate device, said candidate device encrypting data with the confidential domain key; and
outputting the encrypted confidential domain key and the encrypted data for storage on a remote network,
wherein a network server is configured to store, on the remote network, a domain list comprising a domain identifier, an encryption key of each domain member device, a message authentication code including each encryption key and a domain authentication key derived from the confidential domain key, and the encrypted encryption keys that correspond to each domain member device,
wherein when a domain member device is removed from the domain: the encryption key corresponding to said domain member is deleted from the existing domain list;
a new confidential domain key is created;
the new confidential domain key is encrypted with each remaining encryption key obtained from the existing domain list and wherein a new message authentication code is produced based on the new confidential domain key and the remaining encryption keys; and
an updated domain list is created based on the new confidential domain key and wherein the updated domain list is stored on the network.

4. The method according to claim 3, further comprising: said candidate device included in said authorized domain fetching the encrypted confidential domain key which is encrypted by the encryption key of said storing candidate member device included in said authorized domain, decrypting the encrypted confidential domain key with the decryption key of the storing candidate device, and accessing encrypted data stored on the remote network, which data is user data stored by any accessing domain member device.

5. The method according to claim 4, further comprising: sending said encryption key from the candidate device to the domain member device via the authenticated channel, wherein said encryption key is a public key and said decryption key is a private key of the candidate device, which private key corresponds to said public key.

6. The method according to claim 1, further comprising: establishing a confidential channel between the domain member device and the candidate device that is to be included in the domain, over which confidential channel the encryption key of the candidate device is received by the domain member device.

7. The method according to claim 4, wherein said encryption key is a public key and said decryption key is a private key of the candidate device, which private key corresponds to said public key.

8. The method according to claim 4, wherein said encryption key is a confidential symmetric key of the candidate device and said decryption key is the same confidential symmetric key.

9. The method according to claim 4, wherein encrypting data before storing the encrypted data on the network and decrypting said encrypted data is performed by a file encryption key generated by executing a pseudo random function based on a function input comprising the confidential domain key and a domain identifier.

10. The method according to claim 1, wherein said authenticated channel comprises a location-limited channel requiring physical closeness of said domain member device and said candidate device.

11. The method according to claim 1, wherein said domain member device comprises a master device.

12. The method according to claim 1, further comprising storing the updated domain list on the remote network by appending the updated domain list to the existing domain list.

13. The method according to claim 12, further comprising:
initializing a usage counter when a new confidential domain key is created;
incrementing the usage counter when a data file is encrypted by means of the new domain key; and decrementing the usage counter when a data file is decrypted by means of the new confidential domain key, wherein an existing domain list can be deleted if its domain key is no longer in use, which is indicated by the usage counter reaching an associated initialization value and a domain list being appended to the domain list to be deleted.

14. The method according to claim 1, further comprising:
decrypting, at the master device, the encrypted data stored on the remote network by means of the confidential domain key;
encrypting, at the master device, the data by means of the new confidential domain key and storing the encrypted data on the network; and
deleting the existing domain list.

15. An apparatus comprising:
a processor configured, with software, to cause the apparatus to
establish an authenticated channel between the apparatus, acting as a domain member device, and a candidate device that is to be included in an authorized domain, over which channel an encryption key of the candidate device is sent;
encrypt a confidential domain key with the encryption key of said candidate device; and
store the encrypted confidential domain key, so that said candidate device is included in the domain, wherein encrypted data is storable on a remote network for access by devices that belong to the authorized domain, which encrypted data includes data that is encrypted at any storing domain member device by means of the confidential domain key, wherein a network server is configured to store, on the network,
a domain list comprising a domain identifier, the encryption key of each domain member device, a message authentication code including each encryption key and a domain authentication key derived from the confidential domain key, and the encrypted confidential domain key that corresponds to each domain member device,
wherein when a domain member device is removed from the domain:
the encryption key corresponding to said domain member device is deleted from an existing domain list;
a new confidential domain key is created;
wherein the new domain key is used to encrypt with each remaining encryption key obtained from the existing domain list and produce a new message authentication code based on the new confidential domain key and the remaining encryption keys; and wherein an updated domain list is created based on the new domain key and wherein the updated domain list is stored on the network.

16. The apparatus according to claim 15, wherein the encrypted confidential domain key is stored locally at any of the domain member device, or on the network.

17. The apparatus according to claim 15, wherein the encrypted confidential domain key, which is encrypted by the encryption key of said any domain member device, is decryptable with a corresponding decryption key of said any domain member device.

18. The apparatus according to claim 17, wherein remotely stored data is decryptable at any accessing domain member device by means of the confidential domain key, wherein the domain key is obtainable by fetching the encrypted confidential domain key encrypted by the encryption key of said any accessing domain member device, and wherein the encrypted confidential domain key is decryptable with the corresponding decryption key of said any accessing domain member device.

19. The apparatus according to claim 17, wherein said encryption key sent from the candidate device to the apparatus acting as a domain member device via the authenticated channel is a public key and said decryption key is a private key of the candidate device, which private key corresponds to said public key.

20. The apparatus according to claim 15, wherein said encryption key is a confidential symmetric key of the candidate device and said decryption key is the same confidential symmetric key.

21. The apparatus according to claim 15, wherein a file encryption key generated by executing a pseudo random function based on a function input comprising the confidential domain key and a domain identifier is arranged to encrypt data before the encrypted data is stored on the network.

22. The apparatus according to claim 15, wherein a master device included in the domain is configured to include a candidate device.

23. The apparatus according to claim 15, wherein said authenticated channel comprises a location-limited channel requiring physical closeness of said domain member device and said candidate device.

24. The apparatus according to claim 15, wherein the updated domain list is appended to the existing domain list.

25. The apparatus according to claim 24, wherein each confidential domain key has an associated usage counter that is part of the specific domain list to which the domain key belongs, which counter is initialized when a new confidential domain key is created and which counter is incremented when a data file is encrypted by means of the new confidential domain key and decremented when a data file is decrypted by means of the new confidential domain key, wherein an existing domain list can be deleted if its confidential domain key is no longer in use, which is indicated by the usage counter reaching an associated initialization value and a domain list being appended to the domain list to be deleted.

26. The apparatus according to claim 15 wherein the encrypted data stored on the network is decrypted by means of the confidential domain key;
wherein the data is encrypted by means of the new domain key and the encrypted data is stored on the network; and the existing domain list is deleted.

27. An apparatus comprising:
a processor and software configured to cause said apparatus to:
establish an authenticated channel with a candidate device that is to be included in an authorized domain, over which channel authentication data of the candidate device is sent;
encrypt a confidential domain key with the encryption key of the candidate device;
encrypt data with the confidential domain key;
output the encrypted confidential domain key and the encrypted data;
access the encrypted data stored on a remote network; and
decrypt said data by means of the confidential domain key, wherein a network server is configured to store, on the remote network, a domain list comprising a domain identifier, the encryption key of each domain member device, a message authentication code including each encryption key and a domain authentication key derived from the confidential domain key, and the encrypted confidential domain key that corresponds to each domain member device, wherein when a domain member device is removed from the domain:
a corresponding encryption key is deleted from an existing domain list;
a new confidential domain key is created;
wherein the new confidential domain key is encrypted with each remaining encryption key obtained from the existing domain list to produce a new message authentication code based on the new confidential domain key and the remaining encryption keys; and wherein
an updated domain list is created based on the new confidential domain key and wherein the updated domain list is stored on the network.

28. The apparatus according to claim 27, wherein to establish an authenticated channel, a confidential channel is established with the candidate device that is to be included in the domain, over which confidential channel the encryption key of the candidate device is sent.

29. An apparatus comprising:
a processor and software together configured to cause the apparatus to:
send authentication data over an authenticated channel established with a master device that is included in an authorized domain;
encrypt a confidential domain key with an encryption key of the candidate device;
encrypt data with the domain key; and
output the encrypted confidential domain key and the encrypted data for storage of the encrypted data on a remote network, wherein a network server is configured to store, on the network, a domain list comprising a domain identifier, the encryption key of each domain member device, a message authentication code including each encryption key and a domain authentication key derived from the confidential domain key, and the encrypted encryption keys that corresponds to each domain member device, wherein when a domain member device is removed from the domain:
a corresponding encryption key is deleted from an existing domain list;
a confidential new domain key is created;
wherein the new confidential domain key is used to encrypt with each remaining encryption key obtained from the existing domain list and produce a new message authentication code based on the new confidential domain key and the remaining encryption keys; and wherein an updated domain list is created based on the new confidential domain key and wherein the updated domain list is stored on the network.

30. The apparatus according to claim 29, the processor and software together configured to:
access encrypted data of one or more other devices that belong to said authorized domain and that is stored on said remote network; and
decrypt said encrypted data of said one or more other devices accessed on said remote network.

31. A method comprising:
deleting, at a domain master device that belongs to an authorized domain, when a domain member device that belongs to the authorized domain is removed from the authorized domain, an encryption key that corresponds to said domain member device from an existing domain list for the authorized domain, wherein the domain list comprises a domain identifier, an encryption key of each domain member device, a message authentication code including the encryption key of each domain member device and a corresponding domain authentication key derived from the domain key, and an encrypted domain key that corresponds to each domain member device, and which domain list is stored on the storage device;
creating, at the master device, a new confidential domain key;
encrypting, at the domain master device, the new confidential new domain key with each remaining encryption key, said each remaining encryption key being associated with a respective remaining domain member device obtained from the existing domain list and producing a new message authentication code based on the new domain key and the remaining encryption keys; and
creating, at the domain master device, an updated domain list for the authorized domain based on the new confidential domain key and storing the updated domain list on the storage device to which the remaining domain member devices that belong to the authorized domain have access.

32. The method according to claim 31, wherein storing the updated domain list on the storage device further comprises: appending the updated domain list to the existing domain list.

33. The method according to claim 32, further comprising: initializing a usage counter when a new confidential domain key is created; incrementing the usage counter when a data file is encrypted by means of the new confidential domain key; and decrementing the usage counter when a data file is decrypted by means of the new confidential domain key, wherein an existing domain list is deleted if its confidential domain key is no longer in use, which is indicated by the usage counter reaching an initialization value and a domain list being appended to the domain deleted list.

34. The method according to claim 31, further comprising:
decrypting, at the domain master device, the encrypted data stored on the storage device by means of the confidential domain key; encrypting, at the master device, the data by means of the new confidential domain key and storing the encrypted data on the storage device; and
deleting the existing domain list.

35. An apparatus comprising:
a processor and software together configured to
delete, when a domain member device is removed from a domain, a corresponding encryption key that corresponds to said member device from an existing domain list wherein the processor and the software are further configured to cause the apparatus to store, on a storage device, the existing domain list comprising a domain identifier, an encryption key of each domain member device, a message authentication code including each encryption key and a domain authentication key derived from a confidential domain key, and encrypted domain key that corresponds to each domain member device;
create a new confidential domain key;
encrypts the new confidential domain key with each remaining encryption key, said each remaining encryption key being associated with a respective domain member device obtained from the existing domain list and producing a new message authentication code based on the new confidential domain key and the remaining encryption keys; and
create an updated copy of the domain list based on the new confidential domain key and storing the updated domain list on a storage device.

36. The apparatus according to claim 35, wherein the processor and the software are further configured to cause the apparatus to append the updated domain list to the stored domain list.

37. The apparatus according to claim 36, wherein each confidential domain key has an associated usage counter that is part of a specific domain list to which the confidential domain key belongs, which counter is initialized when a new confidential domain key is created and which counter is incremented when a data file is encrypted by means of the new confidential domain key and decremented when a data file is decrypted by means of the new confidential domain key, wherein an existing domain list can be deleted if its confidential domain key is no longer in use, which is indicated by the usage counter reaching an initialization value and a domain list being appended to the domain list to be deleted.

38. The apparatus according to claim 35, wherein the processor and the software are further configured to cause the apparatus to:
decrypt the encrypted data stored on the storage device by means of the confidential domain key;
encrypt the data with the new confidential domain key;
store the encrypted data on the storage device; and
delete the existing domain list.

39. A non-transitory computer computer storage device comprising computer program instructions, which when executed by a processor in an apparatus, causes said apparatus to perform the method of claim 1.

40. A method comprising:
a network server of a remote network controlling access to remotely stored data by
creating access authentication data that is known to said network server of the remote network and to member devices that are allowed to access the data stored on the remote network,
checking the identity of the accessing member device and authenticating the accessing member device by means of a cryptographic operation involving the access authentication data,
the network server further controlling access by the accessing member device to the data stored on the network by
checking whether the accessing member device is in possession of said authentication data, wherein the identity of the accessing member device comprises an identity of a domain to which the member devices belong, and the device authentication is created by the network server receiving a hash value of the access authentication data, wherein a domain list comprising copies of the access authentication data is stored on the remote network, each copy being encrypted by a public key of each member device having access to said data stored on the remote network and
creating, at the network server, new access authentication data when a member device is removed from the domain; and
replacing the existing domain list with a new domain list that contains the new access authentication data.

41. The method according to claim 40, wherein said access authentication data is an access key.

42. Apparatus comprising:
a processor; and
a storage device having a stored computer program configured to, with the processor, cause the apparatus at least to:
store access authentication data that is in possession of devices that are allowed to access data stored in a domain list comprising copies of the access authentication data, each copy being encrypted by a public key of each device having access to said data on a remote network;
check whether a device seeking access to the data stored on the remote network is in possession of said access authentication data by an identity check of said device seeking access to the data stored on the remote network and by an authentication check of the device seeking access to the data stored on the remote network by means of a cryptographic operation involving the access authentication data,
wherein the identity of said device seeking access to the data stored on the remote network is checked for an associated identity of the domain to which the device belongs, and authentication of the device is performed with a hash value of the access authentication data, wherein the stored computer program is configured to, with the processor, cause the apparatus to:
store new access authentication data when a member device is removed from the domain; and
replace the domain list with a new domain list that contains the new access authentication data.

43. The apparatus according to claim 42, wherein the stored computer program is configured to, with the processor, cause the apparatus to decrypt the encrypted data stored on the remote network by means of a domain key; encrypt the data by means of a new domain key and store the encrypted data on the network and then replace the domain list with a new domain list.

44. The apparatus according to claim 42, wherein said access authentication data is an access key.

* * * * *